(12) United States Patent
Cao et al.

(10) Patent No.: US 11,945,066 B2
(45) Date of Patent: Apr. 2, 2024

(54) METHOD FOR ON-LINE MONITORING DEFECTS OF MILLING TOOL

(71) Applicant: CHONGQING UNIVERSITY, Chongqing (CN)

(72) Inventors: Huajun Cao, Chongqing (CN); Degui Qiu, Chongqing (CN); Hu Liu, Chongqing (CN); Yingqing Chai, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 408 days.

(21) Appl. No.: 17/425,156

(22) PCT Filed: Sep. 3, 2020

(86) PCT No.: PCT/CN2020/113144
§ 371 (c)(1),
(2) Date: Jul. 22, 2021

(87) PCT Pub. No.: WO2021/043192
PCT Pub. Date: Mar. 11, 2021

(65) Prior Publication Data
US 2022/0118574 A1 Apr. 21, 2022

(30) Foreign Application Priority Data
Sep. 3, 2019 (CN) .......................... 201910828083.6

(51) Int. Cl.
*G08B 21/00* (2006.01)
*B23Q 17/09* (2006.01)

(52) U.S. Cl.
CPC ..... *B23Q 17/0957* (2013.01); *B23Q 17/0971* (2013.01)

(58) Field of Classification Search
CPC ............ B23Q 17/0957; B23Q 17/0971; G05B 19/406; G05B 2219/35176; G05B 2219/37434; G05B 2219/50041
See application file for complete search history.

(56) References Cited

U.S. PATENT DOCUMENTS

| 4,831,365 A * | 5/1989 | Thomas ............. B23Q 17/0961 73/104 |
| 4,918,427 A | 4/1990 | Thomas et al. |

(Continued)

FOREIGN PATENT DOCUMENTS

| CN | 105058165 A | 11/2015 |
| CN | 109514349 A | 3/2019 |

(Continued)

OTHER PUBLICATIONS

International Search Report cited in Chinese International Appln. No. PCT/CN2020/113144 dated Sep. 3, 2020.

*Primary Examiner* — Toan N Pham
(74) *Attorney, Agent, or Firm* — BACON&THOMAS,PLLC

(57) ABSTRACT

The present disclosure relates to a method for online monitoring defect of a milling tool, comprising the steps of: 1) installing a vibration sensor module on a machine tool spindle; 2) acquiring initial sample data; 3) setting a threshold value $\Delta S_0$ with a time interval of T; 4) measuring vibration signals of n blades in x, y and z directions in each period $T_0$; 5) shaping to obtain n strong vibration cutting wave data respectively formed by n blades in x and y directions in each period $T_0$; 6) analyzing and processing the strong vibration cutting wave data to obtain the difference $\Delta S_0'$ between the cutting strong vibration wave areas formed by each blade in each period $T_0$; 7) outputting a blade wear or defect signal to a display alarm module according to the (Continued)

constraint conditions by a data comparing and analyzing module, and giving an alarm by a display alarm module.

5 Claims, 5 Drawing Sheets

(56) References Cited

U.S. PATENT DOCUMENTS

| | | | | |
|---|---|---|---|---|
| 5,407,265 A | * | 4/1995 | Hamidieh | B23Q 17/0947 73/104 |
| 9,222,350 B2 | * | 12/2015 | Vaughn | E21B 47/01 |
| 2003/0060920 A1 | * | 3/2003 | Kishlyansky | G01H 1/003 702/56 |

FOREIGN PATENT DOCUMENTS

| | | |
|---|---|---|
| CN | 110587377 A | 12/2019 |
| DE | 19728653 A1 | 1/1999 |

\* cited by examiner

METHOD FOR ON-LINE MONITORING DEFECTS OF MILLING TOOL

This application claims the priority of the Chinese patent application filed in China National Intellectual Property Administration on Sep. 3, 2019, with the Application NO. 201910828083.6 and entitled as "Method For On-Line Monitoring Defects Of Milling Tool", the entire content of which is incorporated in this application by reference.

TECHNICAL FIELD

The present disclosure relates to the field of numerical control milling, in particular to a method for online monitoring defects of a milling tool.

BACKGROUND

In numerical control milling, such as plane milling and curved surface milling, a cutter head is installed on the cutter bar and a blade is installed on the cutter head for machining. The wear of blades in milling has great influence on the machining dimensional precision, surface roughness and surface texture of workpieces. Moreover, if the blade defects cannot be found in time, it will have a serious impact on the quality of workpieces, and it will also have a harmful impact on the spindle precision of numerical control machine tools.

At present, in actual machining, tool detection is performed using two methods: offline detection, that is, naked eye observation of the blade before and after machining, or using development imaging and laser imaging to detect the wear of the tool (blade); on-line detection, which basically determines the tool defect by the listening to the sound or judging the machining vibration by an operator, and seldom uses instruments and devices for detection.

The first method has problems that it is impossible to perform on-line detection, long in auxiliary machining time and low in machining efficiency. The second method requires higher skills of operators, and there is the possibility of misjudgment. If misjudged, it may have serious consequences.

At present, in the field of numerical control milling, the technology of on-line monitoring wear of a milling tool can be used for on-line monitoring defects of a milling tool, but the present technology of on-line monitoring wear of a milling tool is usually based on force sensors. Compared with traditional force sensors, vibration acceleration sensors have obvious advantages in installation and implementation, but there is no technology of on-line monitoring defects of a tool based on milling vibration signals.

SUMMARY

According to the technical scheme adopted for realizing the purpose of the present disclosure, the method for online monitoring defects of a milling tool comprises the steps of:

1) establishing a three-dimensional space coordinate system oxyz centering on a machine tool spindle, wherein z axis is located on the axis of the machine tool spindle, and the x and y axes are perpendicular to the z axis, respectively, installing a vibration sensor module on the machine tool spindle, starting the machine tool spindle, and debugging the vibration sensor module to ensure that the signals in x, y and z directions meet the requirements;

2) acquiring initial sample data;

2.1) taking one revolution of the spindle as a period $T_0$;

2.2) when n blades on the cutter head enter normal milling, where $2 \leq n \leq 8$, measuring, by the vibration sensor module, the initial vibration signals of n blades in x, y and z directions within a period $T_0$, and outputting the initial vibration signals to the data acquiring and signal shaping module;

2.3) receiving and shaping the initial vibration signal, by the data acquiring and signal shaping module, to obtain n initial cutting wave data respectively formed by n blades in x and y directions in a period $T_0$, and outputting the initial cutting wave data to the data comparing and analyzing module;

2.4) analyzing and processing, by the data comparing and analyzing module, the initial cutting wave data to obtain a sample cutting wave area $S_1$ in a period $T_0$, which will be saved as the initial sample data;

3) according to the requirement of machining precision, setting a threshold value $\Delta S_0$ of the difference between the cutting strong vibration wave areas formed by each blade in a period $T_0$ in a data comparing and analyzing module; setting a time interval period T in a data comparing and analyzing module, $T=mT_0$, wherein m is an even number greater than n, and setting a threshold value $\Delta S_1$;

4) when the workpiece is processed formally, measuring, by the vibration sensor module, the vibration signals of n blades in x, y and z directions in each period $T_0$ in real time, and outputting the vibration signals to the data acquiring and signal shaping module;

5) receiving and shaping the vibration signal, by the data acquiring and signal shaping module, to obtain n strong vibration cutting wave data respectively formed by n blades in x and y directions in a period $T_0$, and outputting the strong vibration cutting wave data to the data comparing and analyzing module;

6) analyzing and processing, by the data comparing and analyzing module, the strong vibration cutting wave data to obtain the difference $$\Delta S_0^l = \sum_{i=1, j=1}^{n} |x_i - x_j|$$

between the cutting strong vibration wave areas formed by each blade in each period $T_0$, wherein $i \neq j$, n is the number of blades;

7) comparing, by the data comparing and analyzing module, the size relationship between $\Delta S_0'$ and $\Delta S_0$ from time to time, wherein if $\Delta S_0 < \Delta S_0'$, and $\Delta S_0 < \Delta S_0'$ still holds after comparing the following two consecutive sets of data, the data comparing and analyzing module outputs the blade defect signal to the display alarm module, and the display alarm module issues an alarm;

8) if the data comparing and analyzing module does not output the blade defect signal during the machining process in step 7), comparing, by the data comparing and analyzing module, the difference value $\Delta S_1' = |S_1 - \overline{S}_1|$ between the average values $\overline{S}_1$ and $S_1$ of the blade cutting wave areas in m periods $T_0$ and $\Delta S_1$ according to the set period T; wherein if $\Delta S_1 < \Delta S_1'$, and $\Delta S_1 < \Delta S_1'$ still holds after comparing the following two consecutive sets of data and reducing the monitoring period by half in turn, the data comparing and analyzing module outputs a blade wear signal to the display alarm module, and the display alarm module issues an alarm.

Further, in step 7), if the following two consecutive sets of data do not satisfy $\Delta S_0 < \Delta S_0'$, proceed to step 8).

Further, the method further comprises step 9), wherein if the display alarm module does not issue an alarm during the whole machining process, the data comparing and analyzing module records the machining parameters of the whole process, analyzes and processes the acquired strong vibration cutting wave data to obtain and save the cutting wave area as a signal comparison sample material for later machining of the same workpiece.

Further, in step 8), if the following two consecutive sets of data do not satisfy $\Delta S_1 < \Delta S_1'$, proceed to step 9).

Further, in step 9), the machining parameters comprise the sampling frequency f, the number of blades n, the threshold value $\Delta S_0$, the threshold value $\Delta S_1$, the period $T_0$ and the period T.

The technical effect of the present disclosure is undoubted. Based on the precision requirement of a machined workpiece, the present disclosure can realize rapid tool defect monitoring, alarm and machine tool shutdown processing through acquisition and analysis processing of online vibration signals. The defect or wear of a tool can be monitored online by two comparison methods, instead of detecting a tool before and after machining at present, which improves the machining efficiency. The method of the present disclosure is simple and obvious in monitoring effect, which can obviously reduce the machining loss resulted from wear or defect of a tool, thus improving the quality of the machined workpiece.

BRIEF DESCRIPTION OF THE DRAWINGS

The present disclosure will be further explained with reference to the accompanying drawings.

DETAILED DESCRIPTION

The present disclosure will be further explained with reference to the embodiments hereinafter, but it should not be understood that the scope of the above subject matter of the present disclosure is only limited to the following embodiments. Without departing from the above technical ideas of the present disclosure, various substitutions and changes can be made according to the common technical knowledge and conventional means in this field, which should be included in the protection scope of the present disclosure.

Embodiment 1

Figure 1:
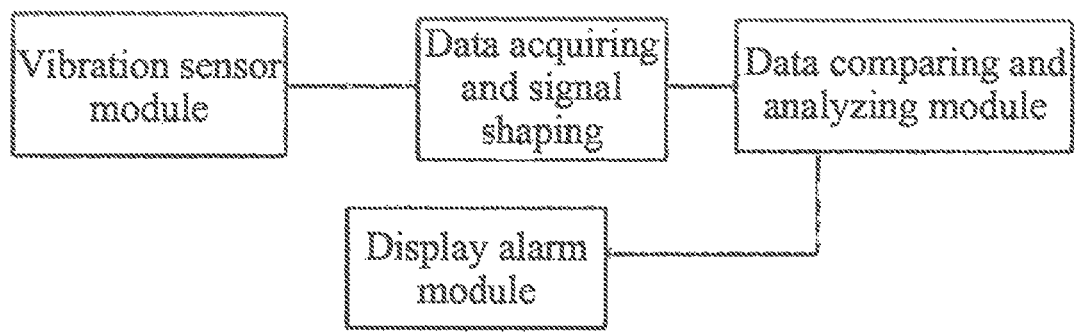
FIG. 1 is a schematic diagram of signal transmission flow according to the present disclosure.

The embodiment discloses a method for online monitoring defects of a milling tool, as shown in FIG. 1, comprising the following steps.

Figure 2:
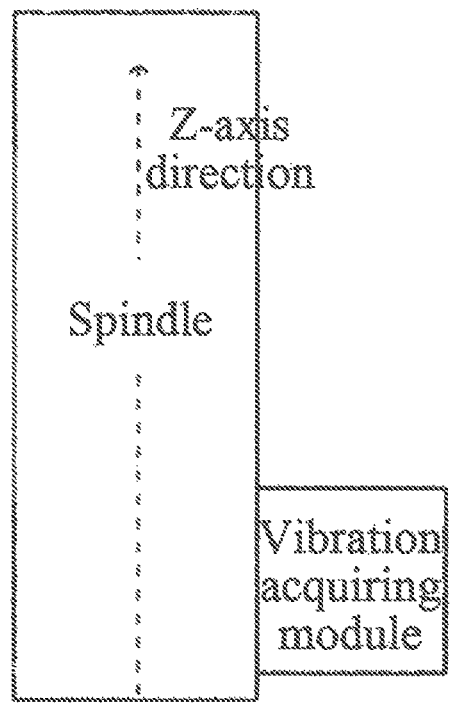
FIG. 2 is a schematic diagram of the installation of a vibration acquiring module according to the present disclosure.

1) Referring to FIG. 2, a three-dimensional space coordinate system oxyz centering on a machine tool spindle is established, wherein z axis is located on the axis of the machine tool spindle, and the x and y axes are perpendicular to the z axis, respectively. A vibration sensor module is installed on the machine tool spindle, the machine tool spindle starts, and the vibration sensor module is debugged to ensure that the signals in x, y and z directions meet the requirements.

Figure 3:
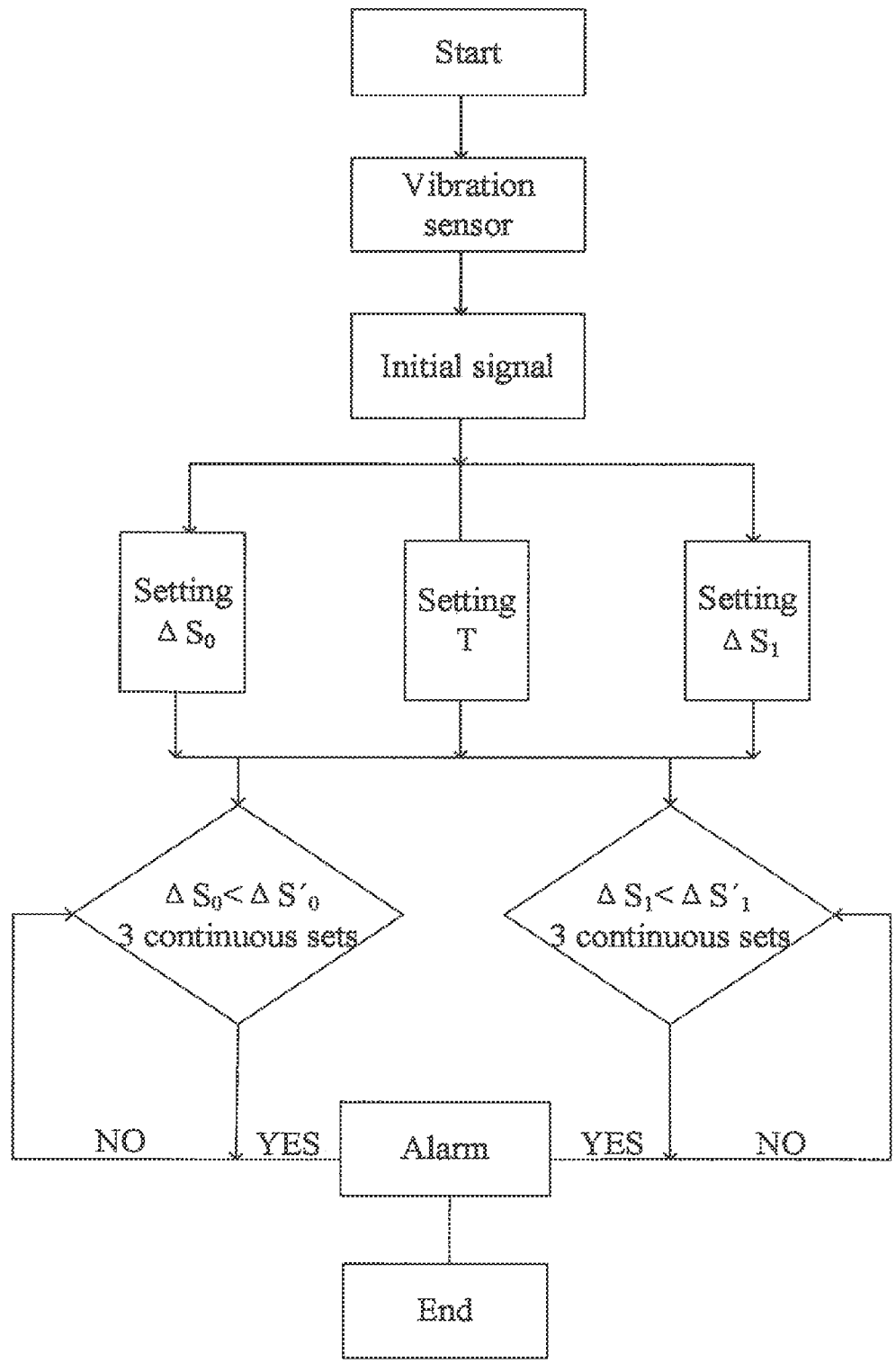
FIG. 3 is an operation flow chart according to the present disclosure.

2) Referring to FIG. 3, initial sample data is acquired. Specifically, 2.1) one revolution of the spindle is taken as a period $T_0$.

2.2) In this embodiment, there are four blades on the cutter head, and the blade numbers are 1, 2, 3 and 4, respectively. When four blades on the cutter head enter normal milling, the vibration sensor module measures the initial vibration signals of four blades in x, y and z directions within a period $T_0$, and outputs the initial vibration signals to the data acquiring and signal shaping module.

Figure 6:
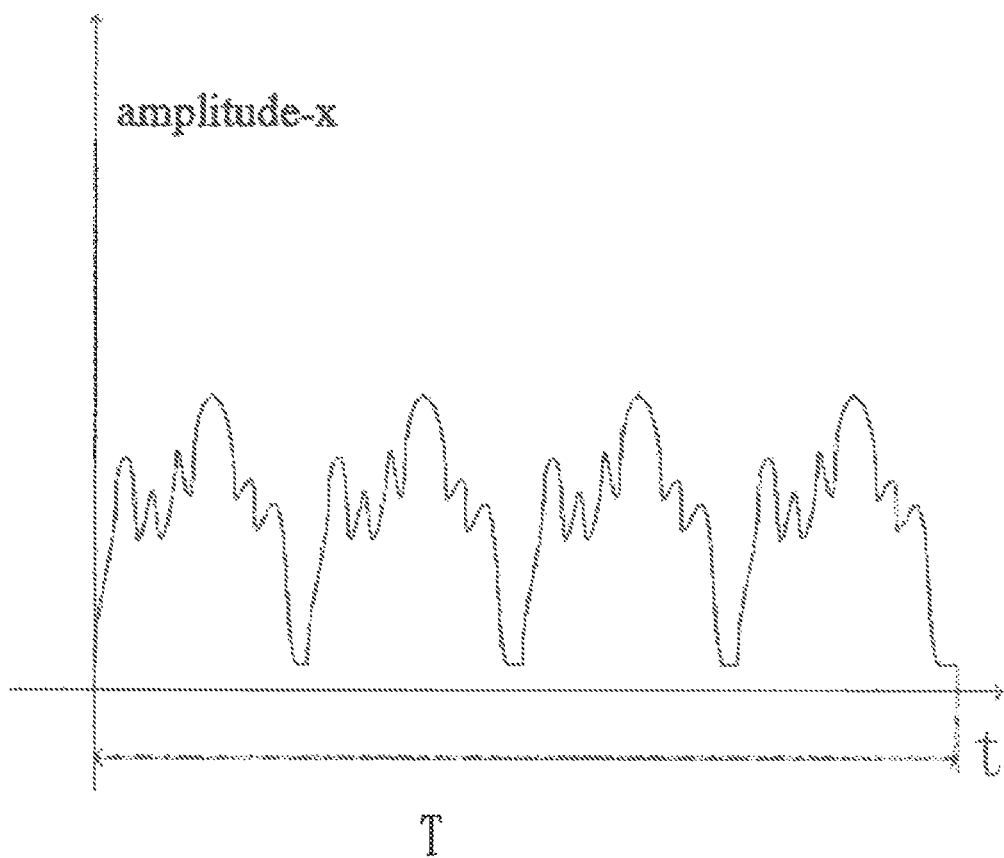
FIG. 6 is a schematic diagram of the amplitude of initial cutting wave data in x direction without processing.
Figure 7:
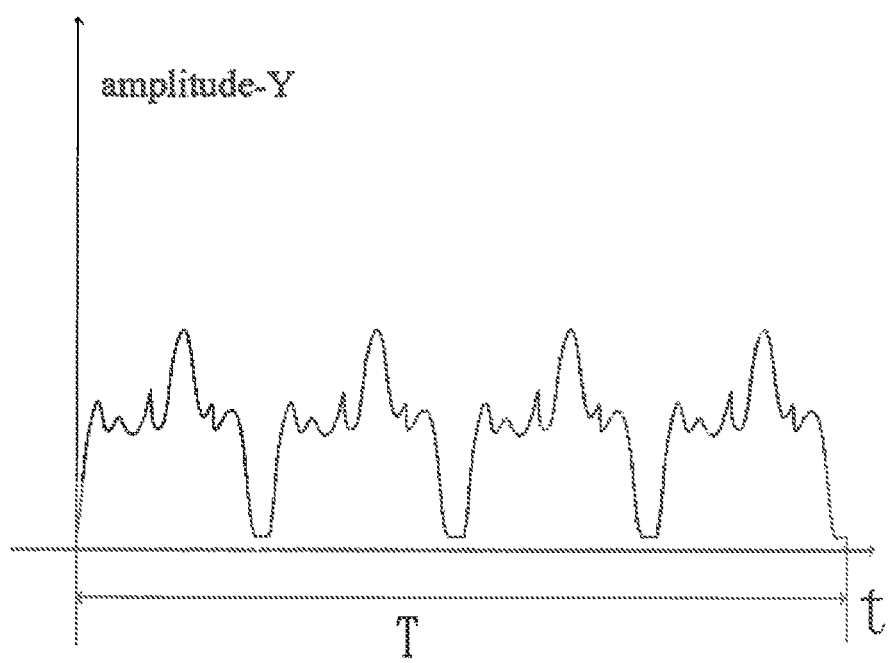
FIG. 7 is a schematic diagram of the amplitude of initial cutting wave data in y direction without processing.

2.3) The data acquiring and signal shaping module receives and shapes the initial vibration signal. Taking the maximum change of vibration in x and y directions into account, vibration data in x and y directions is acquired. In one period, 20 points are uniformly sampled for each blade, and 80 points are acquired for four blades. The spindle has a rotating speed of 1800 r/min, and a total of 16000 points are acquired. The sampling frequency is f=2400 Hz. After fitting 20 points into a curve, it is the cutting wave of the corresponding blade to obtain four initial cutting wave data respectively formed by four blades in x and y directions in a period $T_0$. As shown in FIG. 6 and FIG. 7, the initial cutting wave data is output to the data comparing and analyzing module.

2.4) The data comparing and analyzing module analyzes and processes the initial cutting wave data to obtain its corresponding area $$S_{T0} = \sum_{i=1}^{4} S_i \left( S_i = \int_0^{\frac{T}{4}} f(t)dt \right)$$

in a period $T_0$, and four groups of data will be saved as the initial sample data.

3) According to the requirement of machining precision, a threshold value $\Delta S_0$ of the difference between the cutting strong vibration wave areas formed by each blade in a period $T_0$ is set in a data comparing and analyzing module. In this embodiment, $\Delta S_0 = (0.125 \sim 0.25) S_{T0}$ is set for detecting tool defect. A time interval period T is set in a data comparing and analyzing module, $T = 6T_0$. The time for comparing and sampling the difference between the average value $S_1$ of strong vibration cutting wave area in six periods and the cutting wave area $S_1$ of a sample in one period $T_0$ is set, and a threshold value $\Delta S_1$ is set for detecting the wear condition of the blade, $\Delta S_1 = (0.1 \sim 0.2) S_{T0}$.

4) When the workpiece is processed formally, the vibration sensor module measures the vibration signals of four blades in x, y and z directions in each period $T_0$ in real time, and outputs the vibration signals to the data acquiring and signal shaping module.

5) The data acquiring and signal shaping module receives and shapes the vibration signal to obtain four strong vibration cutting wave data respectively formed by four blades in x and y directions in each period $T_0$, and outputs the strong vibration cutting wave data to the data comparing and analyzing module.

6) The data comparing and analyzing module analyzes and processes the strong vibration cutting wave data to obtain the difference $$\Delta S_0^t = \sum_{i=1, j=1}^{n} |x_i - x_j|$$

between the cutting strong vibration wave areas formed by each blade in each period $T_0$, wherein i≠j, $x_i$ is the cutting strong vibration wave area formed by the blade numbered i in one period, $x_j$ is the cutting strong vibration wave area formed by the blade numbered j in one period, and 4 is the number of blades.

7) The data comparing and analyzing module compares the size relationship between $\Delta S_0'$ and $\Delta S_0$ from time to time, wherein if $\Delta S_0 < \Delta S_0'$, blade wear may appear on the surface. If $\Delta S_0 < \Delta S_0'$ still holds after comparing the following two consecutive sets of data, the blade defect appears. The data comparing and analyzing module outputs the blade defect signal to the display alarm module, and the display alarm module issues an alarm. If the following two consecutive sets of data do not satisfy $\Delta S_0 < \Delta S_0'$, it is possible to prevent the vibration increase caused by the defect of the tool in cutting, while the front vibration increase may be caused by the local vibration increase resulted from casting or forging defects.

Figure 4:
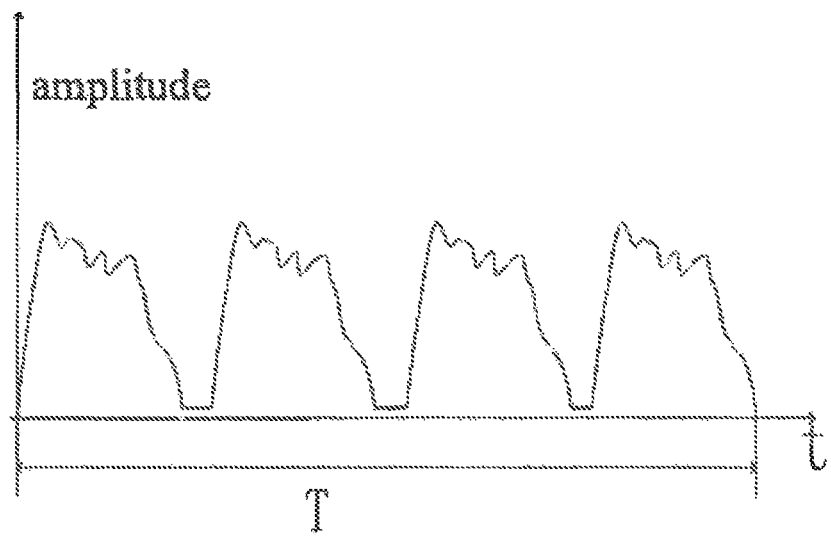
FIG. 4 is a schematic diagram of original signal amplitude of initial cutting wave data.
Figure 5:
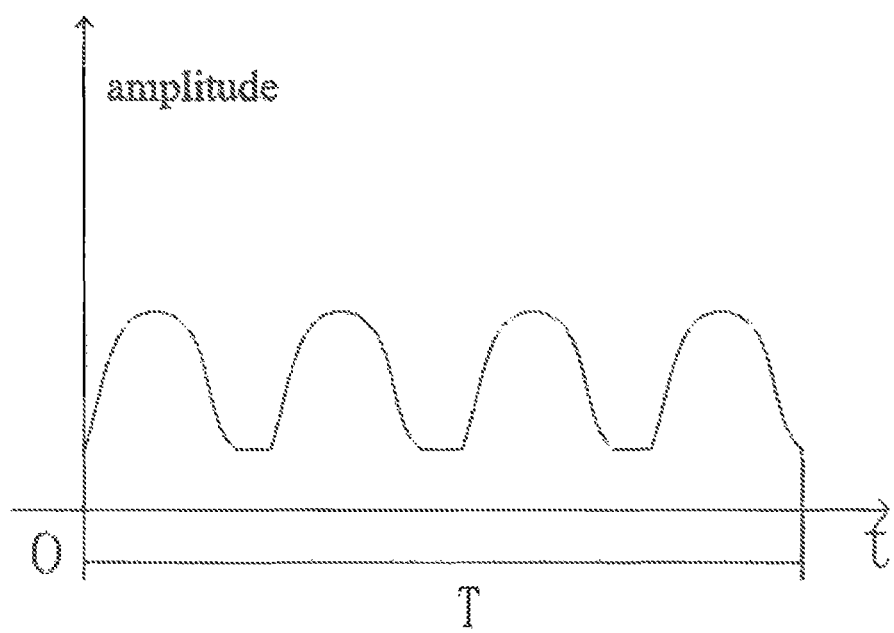
FIG. 5 is a schematic diagram of signal amplitude after processing the average value of cutting wave area.

8) Referring to FIG. 4 and FIG. 5, if the data comparing and analyzing module does not output the blade defect signal during the machining process in step 7), the data comparing and analyzing module compares the difference value $\Delta S_1' = |S_1 - \overline{S}_1|$ between the average values $\overline{S}_1$ and $S_1$ of the blade cutting wave areas in four periods and $\Delta S_1$ according to the set period T. If $\Delta S_1 < \Delta S_1'$, blade wear may appear on the surface. If $\Delta S_1 < \Delta S_1'$ still holds after comparing the following two consecutive sets of data and reducing the monitoring period by half in turn, that is, when the monitoring period will automatically change to ½T and the wear still appears, and when the monitoring period will automatically change to ¼T and the wear still appears, blade wear does appear on the surface. The data comparing and analyzing module outputs a blade wear signal to the display alarm module, and the display alarm module issues an alarm to remind the operator whether to accept the wear. If the wear is accepted, the value of $\Delta S_1$ is reset, otherwise, the blade is replaced. If the following two consecutive sets of data do not satisfy $\Delta S_1 < \Delta S_1'$, it is possible to prevent the blade cutting wave resulted from tool wear in cutting from becoming larger, while the front vibration increase may be caused by the local vibration increase resulted from casting or forging defects.

9) If the display alarm module does not issue an alarm during the whole machining process, the data comparing and analyzing module records the sampling frequency f, the number of blades n, the threshold value $\Delta S_0$, the threshold value $\Delta S_1$, the period $T_0$ and the period T of the whole process, analyzes and processes the acquired strong vibration cutting wave data to obtain and save the cutting wave area as a signal comparison sample material for later machining of the same workpiece.

It is worth noting that for different numbers of blades on different cutter heads, only the corresponding parameters need to be modified in the data comparing and analyzing module, i.e. sampling frequency f, the number of blades n, the threshold value $\Delta S_0$, the threshold value $\Delta S_1$, the period $T_0$ and the period T.

In this embodiment, considering the uneven distribution of rough machining blank stock, the thresholds $\Delta S_0$ and $\Delta S_1$ are compared to take a large value. The semi-finishing and finishing stock are uniformly distributed, and a small value can be taken. In other words, the vibration amplitude of a rough machining spindle varies greatly. The threshold can be set as the acceptable upper limit according to the practical experience of machining the same material in the past. In order to avoid a false alarm, if the comparison exceeds the set threshold, the values of subsequent sampling are not necessarily in the three groups in the example, but more groups can be taken, and conclusions can be drawn after the comparison is continued. Similarly, after rough machining, semi-finishing and finishing, the stock distribution is relatively uniform, and the spindle vibration varies uniformly during machining. The compared thresholds can be set as the lower limit. If the comparison exceeds the set threshold, the values of subsequent sampling are not necessarily in the three groups in the example, which can be reduced or increased. Conclusions are drawn after the comparison is continued.

Further, in this embodiment, the initial sample data acquisition is completed at the beginning. However, in practice, the initial sample data is constantly updated to improve the monitoring precision. In other words, if there is no alarm after a period of rough machining, considering that the blade will definitely wear, there is an error between the cutting wave formed at this time and the cutting wave formed by blade cutting at the beginning, which will further reduce the monitoring precision. The machining precision can be improved by updating the existing data with the latest acquired data without alarm which is nearest to machining.

In this embodiment, based on the precision requirement of a machined workpiece, the present disclosure can realize rapid tool defect monitoring, alarm and machine tool shutdown processing through acquisition and analysis processing of online vibration signals. The defect or wear of a tool can be monitored online by two comparison methods, instead of detecting a tool before and after machining at present, which improves the machining efficiency. The method of the present disclosure is simple and obvious in monitoring effect, which can obviously reduce the machining loss resulted from wear or defect of a tool, thus improving the quality of the machined workpiece.

Embodiment 2

This embodiment discloses a basic implementation, a method for on-line monitoring defects of a milling tool, as shown in FIG. 1, comprising the following steps.

1) Referring to FIG. 2, a three-dimensional space coordinate system oxyz centering on a machine tool spindle is established, wherein z axis is located on the axis of the machine tool spindle, and the x and y axes are perpendicular to the z axis, respectively. A vibration sensor module is installed on the machine tool spindle, the machine tool spindle starts, and the vibration sensor module is debugged to ensure that the signals in x, y and z directions meet the requirements.

2) Referring to FIG. 3, initial sample data is acquired. Specifically, 2.1) one revolution of the spindle is taken as a period $T_0$.

2.2) In this embodiment, there are four blades on the cutter head, and the blade numbers are 1, 2, 3 and 4, respectively. When four blades on the cutter head enter normal milling, the vibration sensor module measures the initial vibration signals of four blades in x, y and z directions within a period $T_0$, and outputs the initial vibration signals to the data acquiring and signal shaping module.

2.3) The data acquiring and signal shaping module receives and shapes the initial vibration signal. Taking the maximum change of vibration in x and y directions into account, vibration data in x and y directions is acquired. In one period, 20 points are uniformly sampled for each blade, and 80 points are acquired for four blades. The spindle has a rotating speed of 1800 r/min, and a total of 16000 points are acquired. The sampling frequency is f=2400 Hz. After fitting 20 points into a curve, it is the cutting wave of the corresponding blade to obtain four initial cutting wave data respectively formed by four blades in x and y directions in a period $T_0$. As shown in FIG. 6 and FIG. 7, the initial cutting wave data is output to the data comparing and analyzing module.

2.4) The data comparing and analyzing module analyzes and processes the initial cutting wave data to obtain its corresponding area $$S_{T0} = \sum_{i=1}^{4} S_i \left( S_i = \int_0^{\frac{T}{4}} f(t)dt \right)$$

in a period $T_0$, and four groups of data will be saved as the initial sample data.

3) According to the requirement of machining precision, a threshold value $\Delta S_0$ of the difference between the cutting strong vibration wave areas formed by each blade in a period $T_0$ is set in a data comparing and analyzing module. In this embodiment, $\Delta S_0 = (0.125 \sim 0.25) S_{T0}$ is set for detecting tool defect. A time interval period T is set in a data comparing and analyzing module, $T=4T_0$. The time for comparing and sampling the difference between the average value $\overline{S}_1$ of strong vibration cutting wave area in four periods and the cutting wave area $S_1$ of a sample in one period $T_0$ is set, and a threshold value $\Delta S_1$ is set for detecting the wear condition of the blade, $\Delta S_1 = (0.1 \sim 0.2) S_{T0}$.

4) When the workpiece is processed formally, the vibration sensor module measures the vibration signals of four blades in x, y and z directions in each period $T_0$ in real time, and outputs the vibration signals to the data acquiring and signal shaping module.

5) The data acquiring and signal shaping module receives and shapes the vibration signal to obtain four strong vibration cutting wave data respectively formed by four blades in x and y directions in each period $T_0$, and outputs the strong vibration cutting wave data to the data comparing and analyzing module.

6) The data comparing and analyzing module analyzes and processes the strong vibration cutting wave data to obtain the difference $$\Delta S_0^t = \sum_{i=1, j=1}^{n} |x_i - x_j|$$

between the cutting strong vibration wave areas formed by each blade in each period $T_0$, wherein i≠j, $x_i$ is the cutting strong vibration wave area formed by the blade numbered i in one period, $x_j$ is the cutting strong vibration wave area formed by the blade numbered j in one period, and 4 is the number of blades.

7) The data comparing and analyzing module compares the size relationship between $\Delta S_0'$ and $\Delta S_0$ from time to time, wherein if $\Delta S_0 < \Delta S_0'$, blade wear may appear on the surface. If $\Delta S_0 < \Delta S_0'$ still holds after comparing the following two consecutive sets of data, the blade defect appears. The data comparing and analyzing module outputs the blade defect signal to the display alarm module, and the display alarm module issues an alarm.

8) Referring to FIG. 4 and FIG. 5, if the data comparing and analyzing module does not output the blade defect signal during the machining process in step 7), the data comparing and analyzing module compares the difference value $\Delta S_1' = |S_1 - \overline{S}_1|$ between the average values $\overline{S}_1$ before and after machining at present, which improves the machining efficiency. The method of the present disclosure is simple and obvious in monitoring effect, which can obviously reduce the machining loss resulted from wear or defect of a tool, thus improving the quality of the machined workpiece.

Embodiment 3

The main steps of this embodiment are the same as those of embodiment 2. Further, in step 7), if the following two consecutive sets of data do not satisfy $\Delta S_0 < \Delta S_0'$, it is possible to prevent the vibration increase caused by the defect of the tool in cutting, while the front vibration increase may be caused by the local vibration increase resulted from casting or forging defects, and proceed to step 8).

Embodiment 4

The main steps of this embodiment are the same as those of embodiment 2. Further, the method comprises step 9), wherein if the display alarm module does not issue an alarm during the whole machining process, the data comparing and analyzing module records the machining parameters of the whole process, analyzes and processes the acquired strong vibration cutting wave data to obtain and save the cutting wave area as a signal comparison sample material for later machining of the same workpiece.

Embodiment 5

The main steps of this embodiment are the same as those of embodiment 3. Further, in step 8), if the following two consecutive sets of data do not satisfy $\Delta S_1 < \Delta S_1'$, it is possible to prevent the blade cutting wave resulted from tool wear in cutting from becoming larger, while the front vibration increase may be caused by the local vibration increase resulted from casting or forging defects, and proceed to step 9).

Embodiment 6

The main steps of this embodiment are the same as those of embodiment 3. Further, in step 9), the machining parameters comprise the sampling frequency f, the number of blades n, the threshold value $\Delta S_0$, the threshold value $\Delta S_1$, the period $T_0$ and the period T. It is worth noting that for different numbers of blades on different cutter heads, only the corresponding parameters need to be modified in the data comparing and analyzing module, i.e. sampling frequency f, the number of blades n, the threshold value $\Delta S_0$, the threshold value $\Delta S_1$, the period $T_0$ and the period T.

The above embodiments are provided only for the purpose of describing the present disclosure, rather than limit the scope of the present disclosure. The scope of the present disclosure is defined by the appended claims. All equivalent substitutions and modifications made without departing from the spirit and principle of the present disclosure shall be covered within the scope of the present disclosure.

What is claimed is:

1. A method for on-line monitoring defects of a milling tool, comprising the steps of:
   1) establishing a three-dimensional space coordinate system oxyz centering on a machine tool spindle, wherein z axis is located on the axis of the machine tool spindle, and the x and y axes are perpendicular to the z axis, respectively, installing a vibration sensor module on the machine tool spindle, starting the machine tool spindle, and debugging the vibration sensor module to ensure that signals in x, y and z directions meet the requirements;
   2) acquiring initial sample data;
   2.1) taking one revolution of the spindle as a period $T_0$;
   2.2) when n blades on a cutter head enter normal milling, where $2 \leq n \leq 8$, measuring, by the vibration sensor module, the initial vibration signals of n blades in x, y and z directions within a period $T_0$, and outputting the initial vibration signals to the data acquiring and signal shaping module;
   2.3) receiving and shaping the initial vibration signal, by the data acquiring and signal shaping module, to obtain n initial cutting wave data respectively formed by n blades in x and y directions in a period $T_0$, and outputting the initial cutting wave data to a data comparing and analyzing module;
   2.4) analyzing and processing, by the data comparing and analyzing module, the initial cutting wave data to obtain a sample cutting wave area $S_1$ in a period $T_0$, which will be saved as the initial sample data;
   3) according to the requirement of machining precision, setting a threshold value $\Delta S_0$ of a difference between cutting strong vibration wave areas formed by each blade in a period $T_0$ in the data comparing and analyzing module; setting a time interval period T in the data comparing and analyzing module, $T=mT_0$, wherein m is an even number greater than n, and setting a threshold value $\Delta S_1$;
   4) when a workpiece is processed formally, measuring, by the vibration sensor module, the vibration signals of n blades in x, y and z directions in each period $T_0$ in real time, and outputting the vibration signals to the data acquiring and signal shaping module;
   5) receiving and shaping the vibration signal, by the data acquiring and signal shaping module, to obtain n strong vibration cutting wave data respectively formed by n blades in x and y directions in a period $T_0$, and outputting the strong vibration cutting wave data to the data comparing and analyzing module;
   6) analyzing and processing, by the data comparing and analyzing module, the strong vibration cutting wave data to obtain the difference $$\Delta S_0^I = \sum_{i=1, j=1}^{n} |x_i - x_j|$$

between the cutting strong vibration wave areas formed by each blade in each period $T_0$, wherein $i \neq j$, n is the number of blades;
   7) comparing, by the data comparing and analyzing module, the size relationship between $\Delta S_0'$ and $\Delta S_0$ from time to time, wherein if $\Delta S_0 < \Delta S_0'$, and $\Delta S_0 < \Delta S_0'$ still holds after comparing the following two consecutive sets of data, the data comparing and analyzing module outputs a blade defect signal to a display alarm module, and the display alarm module issues an alarm;
   8) if the data comparing and analyzing module does not output the blade defect signal during the comparing process in step 7), comparing, by the data comparing and analyzing module, the difference value $\Delta S_1' = |S_1 - \overline{S}_1|$ between the average values $\overline{S}_1$ and $S_1$ of the blade cutting wave areas in m periods $T_0$ and $\Delta S_1$ according to a set period T; wherein if $\Delta S_1 < \Delta S_1'$, and $\Delta S_1 < \Delta S_1'$ still holds after comparing the following two consecutive sets of data and reducing the monitoring period by half in turn, the data comparing and analyzing module outputs a blade wear signal to the display alarm module, and the display alarm module issues the alarm.

2. The method for on-line monitoring defects of a milling tool according to claim 1, wherein: in step 7), if the following two consecutive sets of data do not satisfy $\Delta S_0 < \Delta S_0'$, proceed to step 8).

3. The method for on-line monitoring defects of a milling tool according to claim 1, further comprising step 9), wherein if the display alarm module does not issue the alarm during a whole machining process, the data comparing and analyzing module records the machining parameters of the whole process, analyzes and processes the acquired strong vibration cutting wave data to obtain and save the cutting wave area as a signal comparison sample material for later machining of the same workpiece.

4. The method for on-line monitoring defects of a milling tool according to claim 3, wherein: in step 8), if the following two consecutive sets of data do not satisfy $\Delta S_1 < \Delta S_1'$, proceed to step 9).

5. The method for on-line monitoring defects of a milling tool according to claim 3, wherein in step 9), the machining parameters comprise a sampling frequency f, the number of blades n, the threshold value $\Delta S_0$, the threshold value $\Delta S_1$, the period $T_0$ and the period T.

* * * * *